July 11, 1961 L. DE WITTE 2,992,390
METHOD AND APPARATUS FOR ELECTRICAL TESTING OF PIPE
Filed June 18, 1956 2 Sheets-Sheet 1

INVENTOR.
LEENDERT de WITTE
BY Jerry J. Dunlap
ATTORNEY

July 11, 1961  L. DE WITTE  2,992,390
METHOD AND APPARATUS FOR ELECTRICAL TESTING OF PIPE
Filed June 18, 1956  2 Sheets-Sheet 2
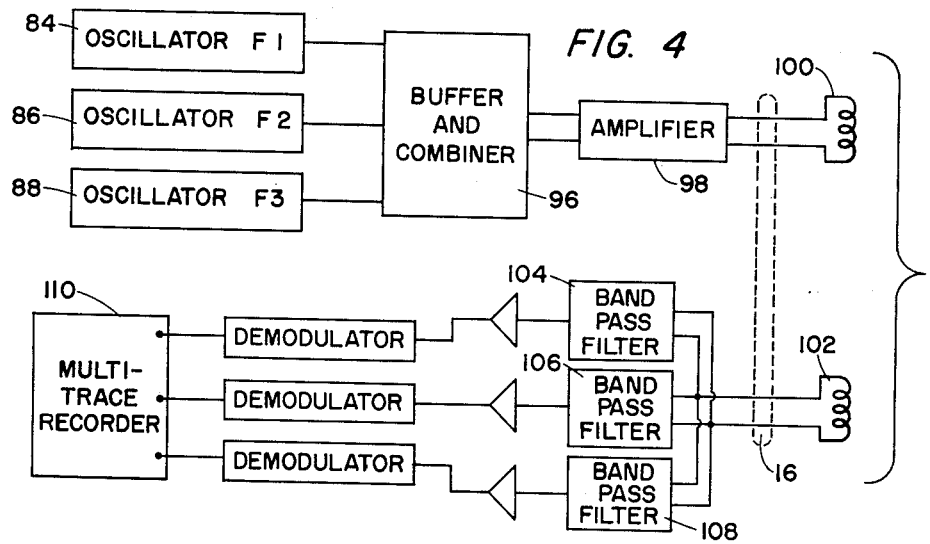
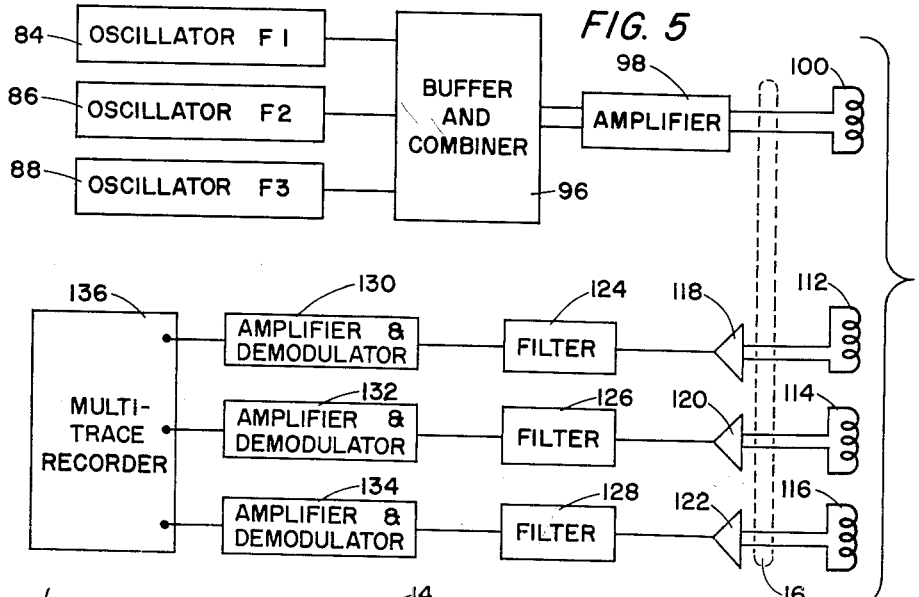
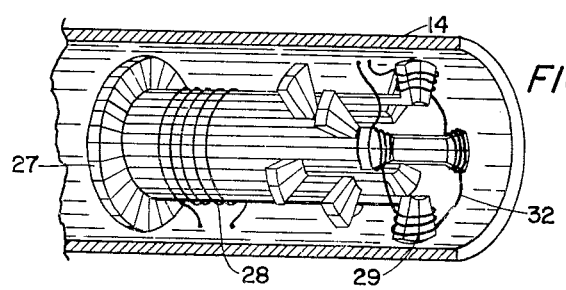
INVENTOR.
LEENDERT de WITTE
BY Jerry J. Dunlap
ATTORNEY Patented July 11, 1961

2,992,390
METHOD AND APPARATUS FOR ELECTRICAL TESTING OF PIPE
Leendert de Witte, Laguna Beach, Calif., assignor to Continental Oil Company, Ponca City, Okla., a corporation of Delaware
Filed June 18, 1956, Ser. No. 592,040
24 Claims. (Cl. 324—37)

This invention relates to a method and apparatus for the electrical testing of pipe, particularly ferrous pipe or pipe having some iron content. More specifically this invention pertains to a method and apparatus for determining, by electrical means, various physical properties such as pipe thickness, pitting or corrosion, and permeability and thickness variations of ferrous or other metal pipe.

In those situations where lengths of pipe are buried in the ground, such as oil well casings, gas, oil or water pipes etc., and the exterior of such pipes is not accessible but the interior of such pipes is accessible, a method and apparatus for the determination of the physical condition of the pipe installation by information obtained inside the pipe would be highly desirable. This would permit it to be determined when corrosion of a pipe installation has reached such proportions that replacement is necessary, to avoid costly unexpected failures of the pipe installation with attendant unscheduled shut downs and emergency repairs. Also, it would permit corrective measures to be taken in good time, and would facilitate appraising the value of such measures.

Electrical or electromagnetic devices for determining the thickness of ferrous pipe or casing are known in the prior art. Many of these prior art devices are limited in their scope and applicability to pipes or casings of certain diameter, thickness or composition of which the pipe is formed. Many of these devices are also so delicate that they are limited to closely controlled operating conditions and are unsuited for rugged use in the field.

The most important disadvantage of all of the known prior art devices of this category is that they can determine only one property or measurement of the pipe being examined. This property is that of the apparent pipe wall thickness. So far as is known, none of these prior art devices purports to determine more than this one physical property of the pipe or casing being analyzed.

In situations where it is desired to determine the physical condition and properties of a pipe in situ, as for example, an oil well casing that has been in operation for some period of time, it is essential that the time spent in making such an analysis be held to the absolute minimum so that the pipe installation will not be out of operation for longer than a minimum time. Thus it becomes increasingly important that if the analysis of the pipe is to be performed by passing an apparatus into the pipe and withdrawing it, all of the data necessary to determine the physical condition of the pipe be taken with the minimum number of passes (into and out of the pipe) of the analysis equipment.

In a typical example of the prior art in this field, there is employed an apparatus for determining by electromagnetic means the wall thickness of ferrous pipe. This is accomplished by detecting changes in the flux linkage between a transmitter coil into which an alternating current is fed, and a receiver coil, both of which are located within the pipe. Obviously, the energy picked up by the receiver coil will depend greatly upon the spacing between the transmitter coil and the receiver coil. In such apparatus, when the transmitting coil and receiving coil are closely spaced, the preponderance of energy picked up by the receiving coil will be due to direct coupling between the two coils, and the pipe within which the coils are located will have little or no influence upon the energy picked up by the receiving coil. For a somewhat larger spacing between the transmitting and receiving coil the flux linkage between the two coils will occur mainly along the inside surface layers of the metal pipe, the penetration of the flux into the metal of the pipe being limited by skin effect and dependent upon the frequency of the alternating current fed into the transmitting coil. In such a case the energy picked up by the receiving coil will be independent of the wall thickness of the pipe but will be greatly affected by the permeability of the pipe material or metal. With a still greater spacing between the transmitting coil and receiving coil a large portion of the flux path lies outside the pipe. Since the energy picked up by the receiving coil is propagated from the transmitter coil through the pipe wall, such energy must pass through the pipe wall adjacent the transmitter coil and again adjacent the receiver coil. Thus the total energy picked up at the receiving coil will be a function of the average of the pipe wall thickness adjacent the transmitter and receiver coils, and this information will not disclose local thin spots with any accuracy.

Another defect of proposed systems for pipe thickness measurement employing magnetic flux measurements lies in the fact that a variation in magnetic permeability of the pipe may entirely mask either local pitting or a more general reduction in effective wall thickness. It would hence be desirable to obtain, at one time, measurements of the permeability independent of wall thickness, so that readings as to wall thickness can be corrected for this variable to yield accurate thickness data. The present invention accomplishes this dual function very well.

Accordingly, it is a principal object of this invention to provide a method and apparatus for the electrical testing of a length of pipe to determine a plurality of physical properties of the pipe.

It is another object of this invention to provide a method and apparatus for the electrical analysis of a length of pipe to measure simultaneously a plurality of physical or electrical properties of the pipe.

Another object of this invention is to provide a method and apparatus for the electrical analysis of a length of pipe to determine simultaneously large variations in wall thickness and the extent of pitting caused by corrosion.

It is another object of this invention to provide a method and apparatus suitable to determine by electrical analysis changes in magnetic permeability, and wall thickness variation caused by pitting and corrosion in a metallic pipe.

It is still another object of this invention to provide a method and apparatus for determining, by electrical analysis performed inside the pipe, the extent of corrosion of both the inside and outside surfaces of a metallic pipe.

Another object of this invention is to provide a method and apparatus for the electrical analysis of a length of metallic pipe to measure a plurality of physical and electrical properties of the pipe in a relatively short period of time.

Still another object of this invention is to provide a method and apparatus for the electrical analysis of a length of buried metallic pipe, which is continuous in operation and which will not damage the pipe.

Another object of this invention is to provide a method and apparatus for electrically determining pitting and corrosion in the walls of metallic pipe, the permeability of which is not uniform.

The above, as well as other objects and advantages of the invention will become readily apparent when the following specification is read in conjunction with the attached drawings, in which:

FIG. 4 is a view similar to FIG. 3 of a modified system.

FIG. 5 is a similar view of still another modification.

FIG. 6 is a perspective diagrammatic view of the magnetic circuit of the preferred probe.

Figure 1:
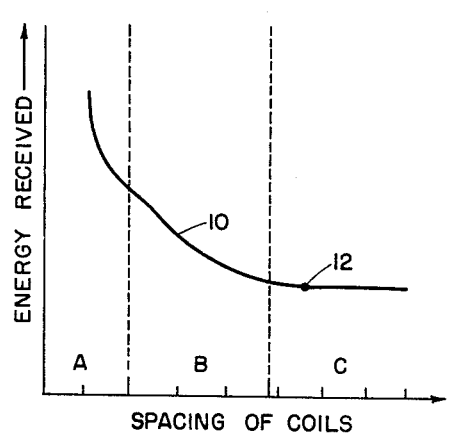
FIG. 1 is a graphical representation of the relationship between the spacing of receiver coils from a transmitter coil, as it affects the energy received in the latter via an external magnetic circuit including the pipe or casing well.

The various conditions that arise in the prior art electromagnetic systems for measuring pipe thickness, which systems utilize two coils within the pipe being measured (one a transmitter coil to which is fed an alternating current, the second a receiver coil spaced axially along the pipe from the transmitter coil to receive electromagnetic energy therefrom), are depicted in the curve illustrated in FIGURE 1 of the drawings. The curve 10 illustrates the relationship between (a) the spacing of the transmitter and receiver coils, plotted as abscissas, and (b) the energy picked up by the receiver coil, plotted as ordinates. Such a curve can be divided into three portions A, B and C for convenience of reference in what follows:

The first portion A of the curve 10 illustrates the result of close spacing between the transmitter and receiver coils. In this case the direct flux coupling between the coils is paramount and the influence of the pipe wall upon the flux path is small or nonexistent.

In region B, where the transmitter and receiver coils are spaced apart a greater distance, the flux path or linkage between the coils is mainly along the inside surface layers of the pipe wall. The penetration of flux into the pipe is limited and is largely dependent upon the skin effect and thus upon the frequency of the alternating current supplied the transmitter coil.

In this portion B of the curve the energy picked up by the receiver coil will be independent of the pipe wall thickness, but will be greatly affected by the permeability of the pipe metal. In the third region C of the curve 10, where the coil spacing is still greater, a large proportion of the flux will extend outward beyond the pipe wall. Since the transmitted energy must in this case traverse the pipe wall adjacent the transmitter coil and again adjacent the receiver coil, the energy received will be a function of the average thickness of the pipe wall in regions adjacent the transmitter coil and the receiver coil, and the permeability.

For maximum signal strength in the receiver coil when operating in region C of the curve 10, the spacing of the coils chosen must not be too far beyond the boundary of region B, as for example, the point 12 indicated in FIGURE 1. This arrangement for measuring pipe wall thickness will work satisfactorily for pipes of small diameter if the magnetic permeability of the pipe is constant.

In large diameter pipe, where variation in wall thickness is occasioned by local corrosion pitting, the prior art systems will not work satisfactorily since these small local variations in pipe wall thickness will be impossible to detect.

The present invention overcomes this difficulty by providing differential measurements of the pipe wall, and is accomplished by the use of at least two closely spaced receiver coils of identical geometric proportions. These coils may be two separate coils or two insulated portions of a single coil, or any other symmetrical coil arrangement of two coils or groups of coils. By virtue of such an arrangement, it is possible to measure the difference in energy received by the two receiver coils from a single source, and thus to eliminate the effects of that portion of the pipe wall opposite the transmitter coil. In addition, effects of the average pipe wall thickness opposite both receiver coils are eliminated to a large extent. The result is that the difference in amount of metal present in respective regions opposite the two receiver coils is shown. Where such difference occurs it is a certain indication of corrosion or pitting.

By use of the two-coil receiver differential method mentioned generally above, it is now possible to determine a plurality of different physical properties or measurements of a pipe casing in situ by a single pass of the apparatus to be described below. For example, the use of the transmitter coil and a single one of the receiver coils permits one to determine large thinning or thickening effects in the pipe casing. By observing the difference in the outputs of the two receiver coils it is possible to determine at the same time local pitting and corrosion.

Where the permeability of the pipe is not constant, the data obtained by the foregoing scheme should be interpreted in the light of permeability variations. To determine the variations in permeability of the pipe casing, the transmitter and a single receiver coil spaced therefrom as indicated in the region B of the curve 10 may be used. The thickness data may then be compensated accordingly.

The apparatus and method of the present invention also makes possible a determination of whether local pitting which is detected is located on the inside or the outside of the pipe. To detect thickness changes due to pitting on the inside of the pipe, a single transmitter coil and a receiver coil spaced apart a distance near the borderline between regions A and B of the curve 10 in FIGURE 1 can be used. Pitting which is undetected by this receiver coil but detected by the differential receiver coils must exist on the outside of the pipe.

A single transmitter coil may be employed in conjunction with a pair of differential receiver coils to determine general thickness variations and local pitting, with a third receiver coil to determine premeability changes, and with a fourth receiver coil to detect inside pitting. The receiver coils are spaced from the transmitting coils in accordance with their respective functions, the differential coils in region C, the permeability coil in region B, and the inside pitting coil near the borderline of regions A and B. If desired a separate general thickness measuring coil may be employed in addition to the differential coils, and separate transmitting coils may be utilized with any of the different receiver coils. Some of the measurements may be made as the device of the invention is moved into the pipe and others as the device is moved out of the pipe. Where the inside pitting receiver coil is omitted, variations in the inside dimensions of the pipe may also be determined by a known type of mechanical caliper mounted on the device, during either the down or up trips.

To decrease the number of receiving coils necessary, the measurement of permeability changes may be made with the same coil arrangement and spacing as that utilized for the wall thickness measurement, by utilizing a current of higher frequency in the transmitter coil. This is effective because of the greater skin effect when the frequency is increased for the same coil spacing.

Figure 2:
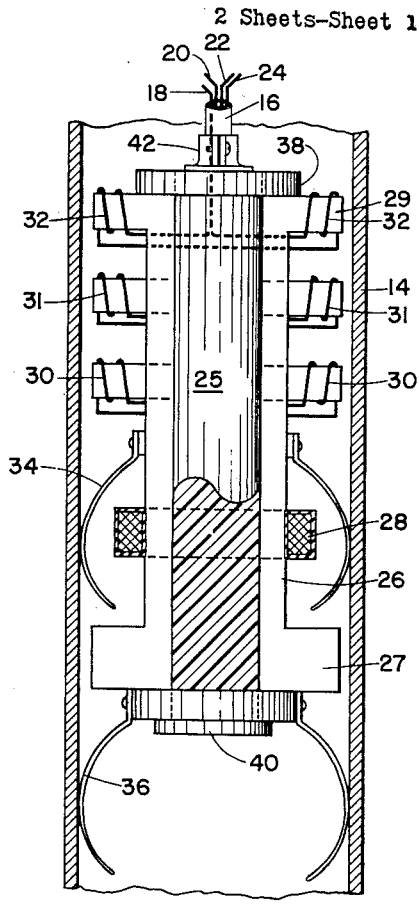
FIG. 2 is a vertical sectional view of a preferred form of probe used in the invention.

The coil arrangements described above must be so constructed that they may be readily extended into and withdrawn from a length of pipe, whether the pipe be in a vertical or inclined position. FIGURE 2 illustrates one embodiment of a coil assembly which is designed for such a purpose. The reference numeral 14 indicates a length of pipe casing which it is desired to inspect and into which the entire coil detector assembly is to be extended for the full casing length and thereafter withdrawn. The entire assembly to be described is lowered into the pipe 14 by means of a cable 16 in which are contained pairs of electrical conductors 18, 20, 22 and 24 which in turn are connected to their proper coils. The entire assembly, which may be called a probe, is mounted upon a central cylindrical rod 25 made of a plastic material or other suitable insulator. Surrounding the central supporting rod 25 is a magnetic core 26.

Preferably, core 26 is made up of laminations of appropriate transformer iron or like magnetically permeable material (see FIG. 6). Each lamination has outwardly extending legs such as legs 27, 29 connected by a body strip, and the laminations are of different lengths to place the receiving coil pole pieces at different distances along the pipe 14 from the common pole 27. As will be understood, the laminations will radiate outwardly from the surface of insulator 25, and the excess space between the outer tips will be taken up by wedges, shims or the like. If wedge-shaped laminations are employed no shims are necessary. The pole tips forming each receiver coil core may be staggered circumferentially so that each set "scans" a particular region at a predetermined distance from the common pole 27.

The transmitting coil 28, connected to leads 18, surrounds a portion of the magnetic circuit common to all the receiver coils. Receiver coil 30 surrounds a set of pole tips nearest the common leg 27, and coils 31 and 32 surround the other spaced pole tips such as 29. The coils are shown schematically in FIG. 2, but are preferably in sections around the respective groups of the lamination tips extending circumferentially of the assembly as shown in FIG. 6. The common flux from the transmitter coil 28 thus passes into the pipe via the differently-spaced receiver poles and coils and returns through the common leg 27.

Receiving coil 30 is connected to the pair of conductors 20 of the cable 16. Receiving coil 31, spaced a greater distance from the common return pole 27 than is the receiver coil 30, is connected to the pair of conductors 22 of the cable 16. Coil 32 is connected to leads 24.

In order to maintain the probe in the center of the pipe being analyzed, the probe is provided approximately at its center with a plurality of spring centralizers 34. A second group of spring centralizers designated 36 may also be mounted upon the lower portion of the probe. The center insulating support 25 may be provided at the ends thereof with enlarged flanged portions 38 and 40. At the top flange 38 the cable or rope 16 is mechanically secured to the entire probe, as by a collar 42. The magnetic poles have an effective diameter which should be approximately ¼ to ½ inch less than the diameter of the pipe being analyzed, to permit free passage of the apparatus through the pipe.

Suitable dimensions of a device for use in testing pipe of 7 inch diameter are as follows:

| | |
|---|---|
| Transmitting coil outside diameter | 6¾ inches. |
| Receiving coils outside diameter | 6¾ inches. |
| Transmitting coil | 100-200 turns, #15 wire. |
| Receiving coils | 2000-5000 turns, #30-#40 wire. |
| Axial length of receiving coil pole faces | Between ½-2 inches. |
| Axial length of transmitting coil pole face 27 | 2 inches. |

In situations where a system utilizing less than three receiving coils is desired, as explained earlier in this specification, a receiving coil may be omitted or left unused.

The spacing between the transmitting and receiving coils, as well as the frequency of the electric current preferred for the determination of the various physical properties of the pipe being examined such as wall thickness, permeability, and location of pits are given as follows:

*Table I*

| Measurement of— | Spacing between transmitter and receiver coils | Frequency of current in transmitter coil |
|---|---|---|
| Thickness of pipe wall | Long | Low. |
| Permeability of pipe metal | Intermediate | Intermediate. |
| Location of corrosion pits | Short | High. |

Figure 3:
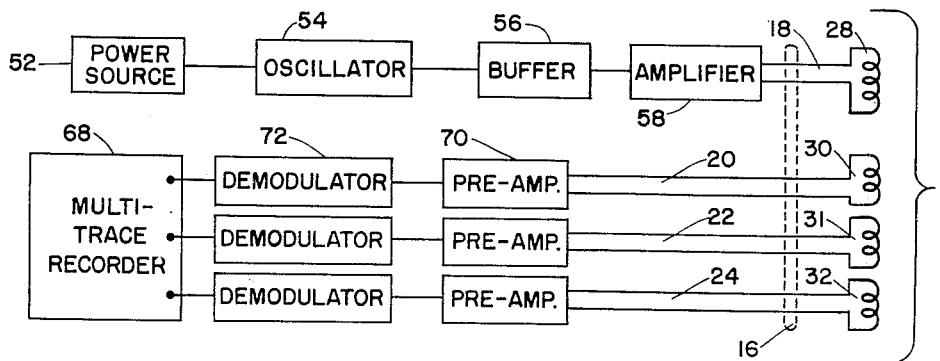
FIG. 3 is a schematic diagram showing the arrangement of apparatus for practicing one variant of the invention.

FIGURE 3 illustrates in block diagram form the electrical portion of one embodiment of this invention in which the transmitter coil is energized with electric current of a single frequency and utilizing three receiving coils differently spaced from the transmitting coil, the output of each receiver coil being amplified, rectified, and fed to a separate recording tracer. A power source 52 is utilized to supply the necessary power to operate an oscillator 54 of any suitable conventional type. The output of the oscillator 54 is fed through a buffer 56 and after being amplified in the amplifier 58 is supplied to the transmitter coil 28. The flux energy transmitted by the coil 28 is picked up by the receiver coils spaced the appropriate distance from the transmitter coil. Three separate channels feed the signals picked up by the three coils 30, 31 and 32 to a three trace recorder 68. The energy picked up by receiver coil 30 is amplified in a preamplifier 70, rectified at 72 and the resultant signal then fed to the recorder 68. Similar channels are provided for the other signals.

For the type of arrangement illustrated in FIGURE 3 the following table illustrates an example of suitable operating parameters, for various values of the frequency of oscillator 54.

*Table II*

| Frequency, cycles/sec. | Spacing in inches between transmitting coil and— | | |
|---|---|---|---|
| | Receiving coil 32 | Receiving coil 31 | Receiving coil 30 |
| 12 | 15 min | 6 min | 2.5 min. |
| 50 | 8 min | 4 min | 1.5 min. |
| 100 | 6 min | 3 min | 1.0 min. |

As has been stated above, somewhat the same effect as is obtained with different coil-spacings may be obtained by using a single receiver coil at a fixed distance from the transmitter coil, and making measurements at three different frequencies. In this case, the variation in energy received by the receiver coil, at the three different frequencies used, is due to the difference in hysteresis, skin effect and penetrative power of the fluxes of such frequencies. In this aspect, FIG. 1 may be considered as a plot of receiver energy against frequency (with decreasing values to the right) rather than against coil distance.

FIG. 4 of the drawings illustrates such a system, using one transmitter and one receiver coil, with three frequencies simultaneously applied to the transmitter coil. The single receiver coil (which may of course be a set of electrically connected coil sections all spaced the same axial distance from the transmitter coil or its pole face) receives all of the frequencies, and transmits them to the surface, where the component frequencies are separated and their amplitudes recorded as before. The amplitude variations in each frequency are utilized in determining the respective pipe characteristics set forth above.

Referring now to FIG. 4, a conventional power source energizes the three oscillators 84, 86 and 88 each operating at its predetermined frequency F1, F2, F3, respectively. The outputs of the three oscillators are combined in a buffer 96 and if desired amplified by the amplifier 98 before being fed to the transmitter coil 100.

The receiver section comprises the single receiver coil 102; this may, for example, be a single receiver coil on a probe otherwise similar to that of FIG. 2, with two of the three receiver coils omitted or at any rate left unused. The combined frequencies detected by this single coil, and now having amplitudes determined by the characteristics of the pipe wall as those characteristics affect the transmission of flux of different frequencies, are separated by band pass filters 104, 106 and 108. The respective outputs of the filters amplified and detected as already described, are applied to the respective inputs to the multi-trace recorder 110.

Suitable frequencies which can be used successfully with probes having the indicated axial spacing between the poles, for the FIG. 4 arrangement, are as follows:

Table III

| Spacing between poles, inches | Frequency range, cycles/second | | |
|---|---|---|---|
| | Oscillator 84 (thickness) | Oscillator 86 (permeability) | Oscillator 88 (inside fitting) |
| 8 | 5 to 50 | 200 to 500 | Over 2,000. |
| 6 | 3 to 30 | 100 to 300 | Over 1,000. |
| 4 | 3 to 15 | 50 to 150 | Over 500. |

The FIG. 4 arrangement permits a very simple layout of equipment and probe, but does not provide the highest resolution because of overlapping of the skin effects attributable to the different frequencies employed. A preferred arrangement, which gives a maximum of separation of readings on adjacent pipe sections and improved resolution and accuracy, will now be described in connection with FIG. 5.

The system illustrated in FIG. 5 utilizes a probe with three receiver coils spaced at different spacings from the transmitter, as illustrated in FIG. 2, but like FIG. 4 supplies the single transmitter coil with three different frequencies. The output channels of the receiving or pickup coils are tuned to particular ones of the mixed frequencies, so that the optimum frequency can be utilized for each particular spacing of a pickup coil from the transmitter coil. Thus, the combined effects of frequency diversity and space diversity are obtained, and the total resolution of the system (its ability to recognize small differences in structure or thickness, or discontinuities closely adjacent one another) is improved.

Referring to FIG. 5, the transmitting channel is in all respects identical to that shown in FIG. 4, and accordingly the parts are designated by the same reference numerals. There are three receiver coils, however, and these are at the proper differential spacings from the transmitter coil; they are designated 112, 114 and 116. The energy received by each receiver coil is conveyed to the surface through appropriate conductors of a cable again designated 16, and separately amplified by pre-amplifiers 118, 120 and 122. The amplified energy is filtered as by filters 124, 126 and 128 to remove any undesired modulation products and to leave only the energy corresponding to the respective originally transmitted frequencies, again amplified if necessary as at 130, 132 and 134, demodulated, and applied to the multiple-trace recorder 136.

Since three different properly chosen frequencies are fed to the transmitter coil 100, the high frequency flux will cover essentially the inside skin of the pipe, and the received signals will be especially sensitive to the variations in flux path gap due to inside pitting at the closest receiver segments or head 112. The intermediate frequency will travel through the main body of the pipe and its flux will be sensitive primarily to the permeability changes in the pipe metal and also to the air gap for example at head 114. The low frequency flux will traverse the wall of the pipe near the transmitter and receiver heads, and the signal induced at the remote head 116 will be sensitive mostly to the total pipe wall thickness and the magnetic permeability of the pipe.

By the arrangement just described it is possible to determine simultaneously the wall thickness, permeability, and pitting of each increment of a length of pipe being examined. In addition this makes possible the determination of pitting on either the accessible or inaccessible wall surface of the pipe being examined or analyzed. By utilization of three separate transmitted frequencies, one such that the resultant flux penetrates the wall thickness and indicates wall thickness and permeability, the second frequency such that the induced magnetization is localized within the wall and varies predominantly only with permeability of the pipe wall, and the third frequency being such as to vary only with small variations of pipe wall thickness, it is possible by separately measuring the difference of such induced magnetizations to obtain a measure of the pipe wall thickness independent of permeability. In addition, by measuring the depth of pitting on the accessible (inside) surface and modifying the derived measure of wall thickness, one can obtain the measure of pitting of the inaccessible pipe wall.

Appropriate data relating the separations in inches of the three heads or pole sets 112, 114 and 116 from the transmitter head 100, for the FIG. 5 configuration, and in terms of the preferred frequencies in cycles per second to which the receiver channel of each receiver head is filtered, are shown in the following:

Table IV

| Receiving head 116 | | Receiving head 114 | | Receiving head 112 | |
|---|---|---|---|---|---|
| Spacing | Frequency range | Spacing | Frequency range | Spacing | Frequency |
| 8 | 5–50 | 6 | 200–500 | 4 | 2,000 |
| 6 | 3–30 | 4 | 100–300 | 2.5 | 1,000 |
| 4 | 3–15 | 3 | 50–150 | 1.5 | 500 |

Instead of employing three separate frequency generators, as in FIGS. 4 and 5 a single oscillator may be swept in frequency at a suitable rate over a band of frequencies wide enough to provide the high, low, and intermediate frequencies required for the operation of these embodiments. The outputs from the filters will then contain only those frequency components necessary to the respective measurements.

In the foregoing description of FIGS. 2–6, measurements of general thickness changes, permeability variations, and inside pitting are described. Where it is desired to include the differential receiver coil feature previously set forth, the thickness receiver coil 32 of FIGS. 2, 3, and 6, or the corresponding coil 116 of FIG. 5 may be divided into two parts. This may be accomplished simply by dividing the pole pieces 29 of FIG. 6 between the pair of coils. When a single receiver coil, such as coil 102 of FIG. 4, is employed, the whole coil may be used for the permeability and inside pitting measurements, and parts of the coil on different pole pieces may be used for the differential thickness measurement. Alternatively, an additional coil may be employed in the last-mentioned measurement.

The observed data obtained from the respective measurements and manifested in the recorded traces must be correlated and interpreted to provide the information desired as to the pipe condition and characteristics. A comparison of the general thickness trace and the permeability trace will disclose whether apparent variations in the thickness trace are due to actual thickness variations or to permeability variations. A close comparison of the traces produced by the outputs from the differential thickness curves will reveal minor differences indicative of local pitting. When pitting is found, observation of the trace produced by the inside pitting receiver coil or the mechanical caliper will reveal pitting on the outside of the pipe. Here again, the permeability trace may be consulted to determine whether the variations in the inside pitting trace are due to actual pitting or to variations in permeability.

While the foregoing correlation process may be carried out visually, it will be apparent to those skilled in the art that suitable apparatus may be employed to perform these functions. For example, the outputs of the general thickness receiver coil and the permeability coil may be subtracted electrically or mechanically and only the differences displayed. The outputs of the differential coils may be applied to a differential amplifier or simply bucked so that only the difference is displayed. It is thus apparent that while preferred embodiments of the invention have been shown and described, modifications can be made without departing from the principles and spirit of the invention. The aforesaid embodiments are therefore to be considered exemplary, rather than restrictive of the invention, the scope of which is set forth in the appended claims, and those modifications which lie within the meaning and range of equivalency of the claims are included therein.

What I claim as my invention is:

1. A method of determining variations in the thickness of a metal wall of variable permeability, which comprises producing, between a pair of magnetic poles spaced apart a predetermined distance, a magnetic flux which penetrates the thickness of said wall and varies with the thickness and the permeability thereof, producing, between a pair of magnetic poles spaced spart a different predetermined distance, a magnetic flux which is confined within said wall and varies with the permeability thereof, detecting the variations in said fluxes by measuring mutual inductance, between the transmitter and receiver coils and comparing the detected variations to obtain a measure of thickness variations free of permeability variations.

2. A method of determining variations in thickness of a metal wall of variable permeability and in which the thickness variations may result from pitting on a surface of the wall which is inaccessible, which comprises producing, between a pair of magnetic poles spaced apart a predetermined distance, a magnetic flux which originates at an accessible side of said wall and which penetrates the thickness of said wall and varies with the thickness and the permeability thereof, producing, between a pair of magnetic poles spaced apart a shorter predetermined distance, a magnetic flux which originates at said accessible side and which is confined within said wall and varies with the permeability thereof, producing between a pair of magnetic poles spaced apart a still shorter predetermined distance a magnetic flux which originates at said accessible side and which is confined to the accessible surface of said wall and varies with the pitting thereof, detecting the variations in said fluxes, by measuring mutual inductance, between the transmitter and receiver coils and comparing said detected variations to obtain a measure of pitting on the inaccessible surface of said wall.

3. A method of determining variations in thickness of a metal wall of variable permeability which comprises simultaneously subjecting said wall to a magnetic flux of a frequency such that the flux penetrates the thickness of said wall and varies with the thickness and the permeability thereof, subjecting said wall to a magnetic flux of a frequency such that the flux is confined within said wall and varies with the permeability thereof, detecting the variations in said fluxes by measuring mutual inductance, between the transmitter and receiver coils and comparing the detected variations to obtain a measure of the thickness variations independent of permeability variations.

4. A method of determining variations in thickness of a metal wall of variable permeability and in which the thickness variations may result from pitting on a surface of the wall which is inaccessible, which comprises simultaneously subjecting said wall to a magnetic flux which originates at an accessible side of the wall and of a frequency such that the flux penetrates the thickness of said wall and varies with the thickness and the permeability thereof, subjecting said wall to a magnetic flux which originates at said accessible side and of a frequency such that the flux is confined within said wall and varies with the permeability thereof, subjecting said wall to a magnetic flux which originates at said accessible side and of a frequency such that the flux is confined to the accessible surface of said wall and varies with the pitting thereof, detecting the variations in said fluxes by measuring mutual inductance, between the transmitter and receiver coils and comparing said detected variations to obtain a measure of pitting on the inaccessible surface of said wall.

5. In the method of claim 4, producing the respective fluxes between pairs of magnetic poles spaced different distances predetermined to enhance the restriction of the fluxes to their respective flux paths.

6. Apparatus for electrical testing of pipe which comprises a magnetic core, a plurality of magnetic pole receiver elements extending radially from said core, a plurality of receiver coils each one independently coupled to one of said elements, a transmitter coil coupled to said core and spaced axially from each of said plurality of elements, a source of current connected to said transmitter coils and having a number of differing frequencies corresponding to the number of said plurality of receiver coils and an indicator separately connected to each of said receiver coils.

7. The apparatus of claim 6 in which the spacing of said plurality of receiver elements from said transmitter coil and the current frequencies supplied by said source are substantially in the following ratios:

| | Spacing | Frequency Range |
|---|---|---|
| First Receiver Element: | 8 inches | 5–50 cycles/sec. |
| | 6 inches | 3–30 cycles/sec. |
| | 4 inches | 3–15 cycles/sec. |
| Second Receiver Element: | 6 inches | 200–500 cycles/sec. |
| | 4 inches | 100–300 cycles/sec. |
| | 3 inches | 50–150 cycles/sec. |
| Third Receiver Element: | 4 inches | 2,000 cycles/sec. |
| | 2.5 inches | 1,000 cycles/sec. |
| | 1.5 inches | 500 cycles/sec. |

8. A method of determining variations in thickness of a wall of variable permeability and in which the thickness variations may result from pitting on at least one surface of the wall and wherein one of said surfaces is inaccessible, comprising simultaneously subjecting the wall to a magnetic flux which penetrates the wall thickness from the accessible side and which varies with the wall thickness and permeability, subjecting the wall to a flux originating at the accessible side and which varies with the permeability thereof, detecting the variations in said fluxes by measuring mutual inductance, between the transmitter and receiver coils also simultaneously detecting local variations in the surface of the accessible wall, correlating the measured mutual inductances, and further correlating the measured mutual inductances with the local variation detected on the accessible surface.

9. A method of determining variations in thickness of a pipe wall of variable permeability, the outer surface of which is inaccessible, which comprises simultaneously subjecting successive regions of said wall along said pipe to a magnetic flux originating within said pipe and which penetrates the thickness of said pipe outwardly and inwardly and varies with the thickness and permeability of said wall, subjecting said regions to a magnetic flux originating within said pipe and which is confined within said wall and varies with the permeability thereof, detecting the variations in said fluxes by measuring mutual inductance, between the transmitter and receiver coils and correlating the said simultaneously produced measured mutual inductances to obviate the effects of permeability on said flux varying with the thickness and permeability of said pipe.

10. The method of claim 9 with the additional step of detecting local variation along the inner surface of said pipe wall at said regions and correlating any detected local variations with total thickness variations independent of permeability variations to distinguish local variations on the outer surface independent of local variation on the inner surface.

11. In apparatus of the type described, a probe assembly for detecting thickness variations in the wall of a metal pipe of variable permeability and adapted to pass through said pipe, said probe assembly comprising a magnetic core having a plurality of magnetic pole-receiver elements extending radially therefrom, each of said pole-receiver elements comprising a plurality of pole pieces disposed circumferentially about said magnetic core, said pole-receiver elements being in axially-spaced relationship to one another, a transmitter coil magnetically coupled to said core and axially-spaced from said pole-receiver elements, and a separate receiver coil coupled to each of said pole-receiver elements.

12. In the apparatus of claim 11, said core being elongated, said transmitter coil surrounding a central portion of said core, the pole pieces for different ones of said receiver coils being spaced from said transmitter coil by different distances on one side thereof, and another pole piece on the other side of said transmitter coil and common to all of said flux paths.

13. In the apparatus of claim 11, said core comprising a group of laminations which form said pole pieces.

14. In the apparatus of claim 11, each of said receiver coils being coupled to a plurality of said pole pieces, each spaced substantially the same distance from said transmitter coil, the pole pieces coupled to each of said receiver coils being disposed radially of the core, and the pole pieces coupled to the different respective receiver coils being mutually staggered circumferentially of said core.

15. In apparatus of the type described, a probe assembly for detecting thickness variations in the wall of a metal pipe of variable permeability and adapted to pass through said pipe, said probe assembly comprising a magnetic core, a plurality of magnetic pole-receiver elements extending radially from said core, a plurality of receiver coils, each one independently coupled to one of said elements, a transmitter coil coupled to said core and spaced axially from each of said plurality of elements, a source of current connected to said transmitter coil and having a number of differing frequencies corresponding to the number of said plurality of receiver coils, and an indicator separately connected to each of said receiver coils.

16. Apparatus for electrical testing of pipe which comprises a magnetic core, a plurality of magnetic pole receiver elements, extending radially from said core a plurality of receiver coils each one independently coupled to one of said elements, a plurality of transmitter coils equal in number to said plurality of receiver coils coupled to said core and spaced axially from each of said plurality of elements, a source of current connected to each of said plurality of transmitter coils and having a total number of different frequencies corresponding to the number of said plurality of receiver coils.

17. In the apparatus of claim 16, said core being elongated, said transmitter coil surrounding a central portion of said core, the pole receiver elements being spaced from said transmitter coil by different distances on one side thereof, and another pole piece on the other side of said transmitter coil and common to all of said flux paths.

18. The apparatus of claim 11 wherein two closely spaced receiver coils of identical geometric proportions are coupled to the pole receiver element located furthermost from said transmitter coil.

19. The apparatus of claim 6 wherein two closely spaced receiver coils of identical geometric proportions are coupled to the pole receiver element located furthermost from said transmitter coil.

20. The apparatus of claim 7 wherein two closely spaced receivere coils of identical geometric proportions are coupled to the pole receiver element located further most from said transmitter coil.

21. The apparatus of claim 6 wherein said core comprises a group of laminations which form said pole pieces.

22. Apparatus for electrical testing of pipe which comprises a magnetic core, a plurality of magnetic pole receiver elements extending radially from said core, said core comprising a group of laminations which form said pole pieces, a plurality of receiver coils each one independently coupled to one of said elements, a plurality of transmitter coils equal in number to said plurality of receiver coils coupled to said core and spaced axially from each of said plurality of elements, a source of current connected to each of said plurality of transmitter coils and having a total number of different frequencies corresponding to the number of said plurality of receiver coils.

23. A method of determining variations in thickness of a metal wall of variable permeability which comprises penetrating through said wall with a magnetic flux which varies with the thickness and permeability of said wall, simultaneously penetrating into but not through said wall with a magnetic flux which is confined to said wall and varies with the permeability of said wall, measuring said fluxes as the mutual inductance between transmitter and receiver coils, canceling the detected variations in the second-mentioned flux from the first-mentioned flux whereby variations in said first-mentioned flux due to variations in thickness of said metal wall are obtained.

24. A method of determining variations in thickness of a metal wall of variable permeability which comprises penetrating through said wall with a magnetic flux which varies with the thickness of said wall, measuring said flux at at least two closely spaced points adjacent plural regions of said wall by measuring mutual inductance between transmitter and identically geometrically proportioned receiver coils, then a measure of local thickness variations is obtained by detecting variations in said flux between said points.

References Cited in the file of this patent

UNITED STATES PATENTS

| | | |
|---|---|---|
| 2,104,643 | Greenslade | Jan. 4, 1938 |
| 2,311,715 | Thorne | Feb. 23, 1943 |
| 2,337,231 | Cloud | Dec. 21, 1943 |
| 2,573,799 | MacLean | Nov. 6, 1951 |
| 2,595,380 | Hudson | May 6, 1952 |
| 2,744,233 | Paivinen | May 1, 1956 |

UNITED STATES PATENT OFFICE
CERTIFICATE OF CORRECTION

Patent No. 2,992,390                            July 11, 1961

Leendert de Witte

It is hereby certified that error appears in the above numbered patent requiring correction and that the said Letters Patent should read as corrected below.

Column 3, line 7, for "well" read -- wall --; column 7, Table III, in the heading to column 4 thereof, for "fitting" read -- pitting --; column 9, line 29, for "spart" read -- apart --.

Signed and sealed this 13th day of February 1962.

(SEAL)
Attest:

ERNEST W. SWIDER
Attesting Officer

DAVID L. LADD
Commissioner of Patents